United States Patent [19]

Hokajärvi

[11] Patent Number: 4,688,790
[45] Date of Patent: Aug. 25, 1987

[54] TORQUE METERING DEVICE FOR A BICYCLE-TYPE ERGOMETER

[75] Inventor: Mauri Hokajärvi, Karjalohja, Finland

[73] Assignee: Tunturipyora Oy, Turku, Finland

[21] Appl. No.: 790,057

[22] Filed: Oct. 22, 1985

[30] Foreign Application Priority Data

Jun. 27, 1985 [FI] Finland .................................. 852543

[51] Int. Cl.$^4$ ............................................. A63B 21/00
[52] U.S. Cl. ................................. 272/73; 272/DIG. 5
[58] Field of Search .................. 272/DIG. 5, DIG. 6, 272/73, 131; 73/862.12, 379, 380, 381; 116/283, 285, 309

[56] References Cited

U.S. PATENT DOCUMENTS

| | | | |
|---|---|---|---|
| 399,942 | 3/1889 | Soeding | 73/380 |
| 734,662 | 7/1903 | Blaisdell | 272/73 |
| 943,391 | 12/1909 | Craig | 73/862.12 |
| 1,115,826 | 11/1914 | Johnson | 73/380 |
| 4,419,890 | 12/1983 | Kotamäki | 73/862.12 |

FOREIGN PATENT DOCUMENTS 0047843  2/1974  Finland .................................. 272/73

Primary Examiner—Richard J. Apley
Assistant Examiner—S. R. Crow
Attorney, Agent, or Firm—Scully, Scott, Murphy & Presser

[57] ABSTRACT

The invention relates to a torque metering device for a bicycle-type ergometer, in which ergometer the braking force is steplessly adjustable and in which the rotational movement is compensated by means of a flywheel. The rotational movement of the flywheel is braked by means of a brake mechanism (6, 7) which is pressed against the flywheel and moves limitedly therewith, whereby the movement of the brake mechanism with the flywheel is restricted by means of a spring balance connected to the brake mechanism and the frame structure of the ergometer. The spring force of the spring balance (9) counteracting the movement of the brake mechanism can be read on a scale (10) of the spring balance, which scale is positioned in the frame structure of the ergometer. In order to provide a reliable and easily readable metering device, the device is so constructed that it comprises a gear rack (12) stationarily fixed with respect to the frame structure. A pin member (13) is fastened on the moveable brake mechanism, the free end of which pin member is provided with a cog wheel (14) which is engaged with the gear rack (12). The indicator is formed by a sliding element (15) provided with a cogging which is engaged with the cog wheel so as to effect a movement of the indicator by means of the gear rack (12), the cog wheel (14) and the cogging of the sliding element (15), which movement exceeds that of the free end of the pin member (13). (FIG. 2)

5 Claims, 3 Drawing Figures

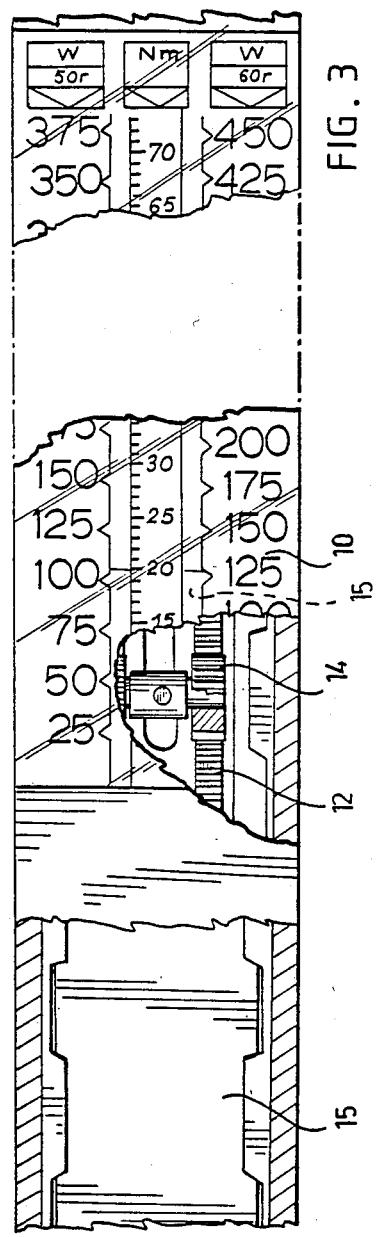
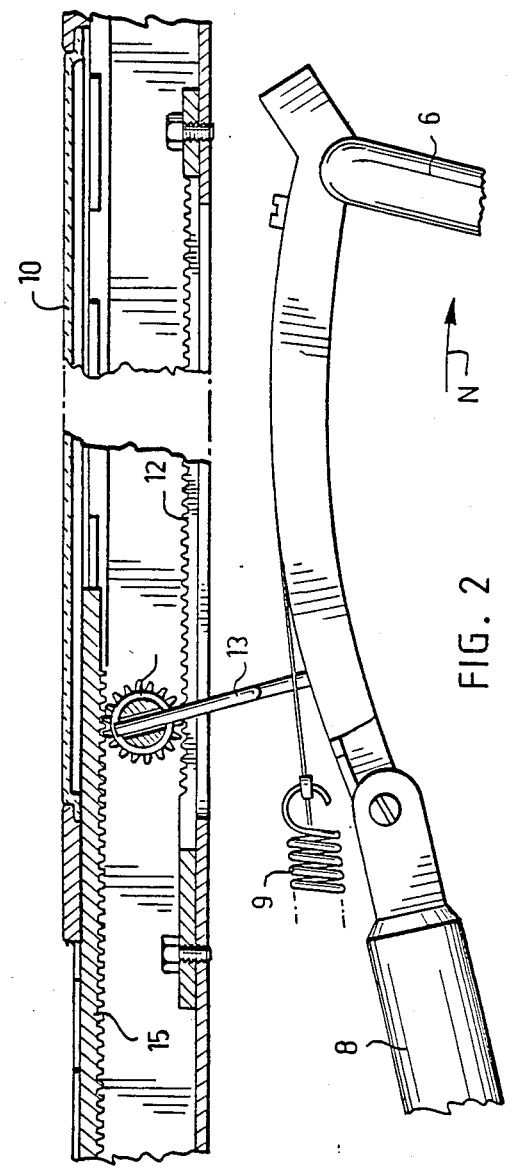

TORQUE METERING DEVICE FOR A BICYCLE-TYPE ERGOMETER

BACKGROUND OF THE INVENTION

The invention relates to a torque metering device for a bicycle-type ergometer, in which ergometer the braking force is steplessly adjustable and in which the rotational movement is compensated by means of a flywheel or the like, whereby the rotational movement of said flywheel is braked by means of a brake mechanism, which is pressed against the flywheel and moves limitedly therewith, the movement of the brake mechanism with the flywheel being restricted by means of a spring balance connected to said brake mechanism and a frame structure of the ergometer, whereby the spring force of the spring balance counter-acting the movement of the brake mechanism is readable on a scale of the spring balance, said scale being positioned in the frame structure of the ergometer.

Torque metering devices of this type are nowadays extremely well-known in connection with different kinds of stationary exercise cycles. One application of this known structure is disclosed in Finnish Patent Specification No. 47,843.

The torque metering device of Finnish Patent Specification No. 47,843 works very well in practice. However, a disadvantage is that the movement of the indicator is relatively small, whereby it is difficult to provide a clear scale. A further difficulty is due to the fact that one must be able to read the scale while treadling the ergometer, i.e. from a relatively great distance, whereby the previous small scales have not proved to be the best possible from the view point of clarity.

SUMMARY OF THE INVENTION

The object of the invention is to provide a torque metering device which avoids the disadvantages of previously used structures. This is achieved by means of a torque metering device according to the invention, which is characterized in that the device comprises a gear rack or the like stationarily fixed with respect to the frame structure of the ergometer, that a pin member is fastened on the moveable brake mechanism, the free end of said pin member being provided with a cog wheel which is in engagement with said gear rack and that the indicator is formed by a sliding element provided with a cogging, the cogging of which sliding element being in engagement with the cog wheel so that a certain movement of the pin member effects a movement of the indicator by means of the gear rack, the cog wheel and the cogging of the sliding element, said movement exceeding that of the free end of the pin member.

An advantage of the invention is mainly that a sufficiently wide movement of the indicator makes it possible to provide a scale of sufficient clarity, whereby the indicator can be advantageously followed when the ergometer is treadled. A further advantage of the invention is its simple construction, whereby the production and maintenance costs remain very low. By virtue of the simple construction, it is possible to fit the device according to the invention in ergometers which are already being manufactured in a highly advantageous manner, whereby the invention can be utilized without any major alternations in the production.

BRIEF DESCRIPTION OF THE DRAWINGS.

The invention will be more closely described in the following by means of one preferred embodiment of the invention, said embodiment being illustrated in the attached drawing, wherein FIG. 2 is a side view of the principal features of the torque metering device according to the invention, FIG. 3 is a top view of the principal features of the torque metering device according to FIG. 2.

DETAILED DESCRIPTION OF THE PREFERRED EMBODIMENTS

Figure 1:
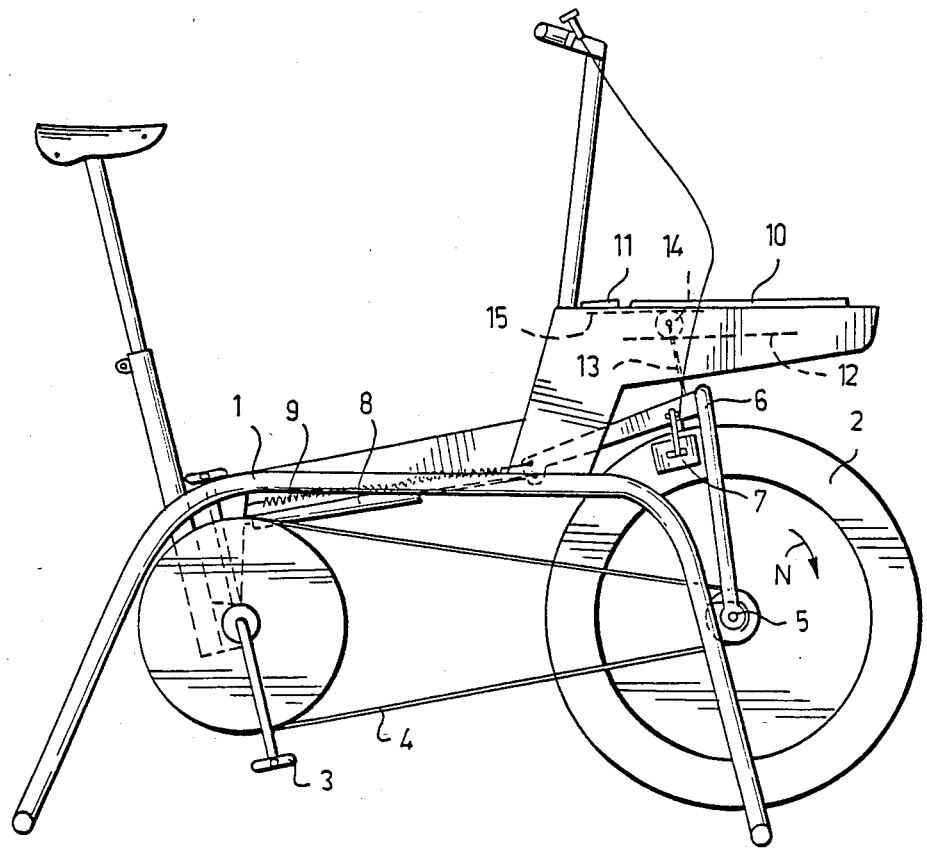
FIG. 1 illustrates the principal features of a bicycle-type ergometer provided with a torque metering device according to the invention.

FIG. 1 illustrates the principles of a bicycle-type ergometer, a frame structure of said ergometer being indicated by the reference numeral 1. A heavy brake disc 2 of a disc brake is rotatably mounted in the frame structure 1, which brake disc acts as a flywheel, the treadling force from pedals 3 being transmitted to said brake disc 2 by means of a chain transmission 4 or the like. Brake pads 7 used for braking of the rotary motion of the brake disc are secured on a supporting arch 6, which, in turn, can be turned around a center 5 of the brake disc. The press force exerted on the sides of the brake disc by the brake pads 7 can be steplessly adjusted by means of a suitable tightening mechanism (not shown in the Figures). In the example of the Figures, the brake pads 7 and the supporting arch 6 together form the brake mechanism. It is obvious that the brake pads tend to be displaced in the direction of movement of the brake disc the more extensively, the more the brake pads are pressed against the disc. Thereby the whole brake mechanism, too, tends to be displaced in the direction of rotation of the brake disc, which direction is indicated by the arrow N. Said displacement is counteracted by a spring balance 9 which is provided with a damper 8. A scale 10 of the spring balance is positioned in front of the user of the ergometer so that the scale can be read while treadling. Except the scale 10, also a meter 11 indicating speed of rotation is provided within the field of vision of the user. Said matters belong to the prior art, so they are not more closely described here.

The torque metering device according to the invention comprises a gear rack 12 or the like stationarily fixed with respect to the frame structure 1 of the ergometer. A pin member 13 is fastened on the brake mechanism which moves with brake pads 7. A cog wheel 14 is provided at the free end of the pin member 13, said cog wheel being in engagement with the gear rack 12. Further, the indicator is formed by a sliding element 15 provided with a cogging. The cogging of the sliding element 15 is in engagement with the cog wheel 14. Said structure particularly well appears from FIGS. 2 and 3.

As is apparent from FIG. 2, the gear rack 12 and the cogging of the sliding element 15 are interconnected by means of the cog wheel 14 in such a manner that a certain movement of the pin member 13 effects a movement of the sliding element 15 which movement exceeds that of the pin member. The operation of the structure appears from FIG. 2. When treadling is started, the brake mechanism tends to be displaced with the brake disc in the direction N, whereby the pin member 13 is correspondingly displaced to the right in FIG. 2. The cog wheel 14 thus starts to rotate, displacing the sliding element 15 to the right over a distance longer than the displacement of the pin member 13. If the treadling is stopped, the brake mechanism, of course, is displaced back to its initial position by the action of the spring force, whereby the indicator moves towards a 0-position by virtue of the movement of the cog wheel in a manner fully similar to that described in connection with the direction N. The relation between the mutual movements of the pin member 13 and the sliding element 15 can be chosen by suitable dimensioning of the cog wheel, for instance.

Because said mechanism enables the movement of the indicator to be made considerably wider than the relatively small movement of the pin member 13, so the indicator can be advantageously adjusted to directly show the effect used for treadling at least at one speed of rotation. This can be effected by constructing the scale 10 so that it directly indicates effect, as in FIG. 3. It is obvious that besides a scale indicating effect, it is also possible to provide a torque indicating scale on the same scale unit which torque indicating scale can be used, e.g., together with the meter 11 indicating speed of rotation. Said torque indicating scale is also shown in FIG. 3.

The above example is by no means intended to restrict the invention, but the invention can be modified within the scope of the claims in various ways. So it is obvious that the device or parts thereof do not need to be exactly similar to those shown in the Figures, but also solutions of some other kind are possible. For example, the gear rack and the sliding element do not need to be straight, but curved structures can be used, whereby the support for of the cog wheel can be made stationary in place of the slide structure illustrated in the Figures. Naturally, the device according to the invention can be provided with any calibration system so as to ensure proper indication. The invention is not, either, restricted to a structure utilizing a disc brake, but the invention can be used also in an ergometer operated on the belt brake principle. So the term brake mechanism, which is used in the claims, may include not only the combination of brake pads and a supporting arch but also a per se known brake belt which is pressed against the outer periphery of the flywheel and other per se known devices used in connection with a brake of this type.

I claim:

1. Torque metering device for a bicycle-type ergometer, wherein the ergometer braking force is steplessly adjustable and in which the rotational movement is compensated by means of a flywheel or the like, whereby the rotational movement of said flywheel is braked by means of a movable brake mechanism (6, 7) which is pressed against the flywheel and moves limitedly therewith, the movement of the brake mechanism with the flywheel being restricted by means of a spring balance (9) connected to said brake mechanism and a frame structure (1) of the ergometer, whereby the spring force of the spring balance counteracting the movement of the brake mechanism is readable on a scale of the spring balance, said scale being positioned in the frame structure (1) of the ergometer, characterized in that the device comprises a gear rack means (12) stationarily fixed with respect to the frame structure (1) of the ergometer, a pin member (13) fastened on the moveable brake mechanism (6, 7), a free end of said pin member being connected to a cog wheel which is in engagement with said gear rack means (12) and that an indicator is formed by a sliding element (15) provided with a cogging rack, the cogging rack being in engagement with the cog wheel so that a relatively small movement of the pin member (13) effects a relatively large movement of the indicator by means of the gear rack means (12), the cog wheel (14) and the cogging rack of the sliding element (15),.

2. Torque metering device according to claim 1, characterized in that the movement of the indicator directly shows the effect used for treadling at least at one speed of rotation.

3. A torque metering device according to claim 1, wherein the cog wheel is rotatably mounted on an axle, and the axle is connected to the free end of said pin member for movement therewith along said gear rack means.

4. A torque metering device according to claim 3, wherein the axle includes a bore, and the free end of said pin member extends into said bore and is supported for sliding movement therein.

5. A torque metering device according to claim 1, further comprising a housing, and wherein the scale forms a top of the housing, the indicator is contained entirely within the housing and is located directly below the scale, and the scale is transparent to allow visual observation of the indicator.

* * * * *